United States Statutory Invention Registration [19]

[11] Reg. Number: H311

Jones et al. [43] Published: Jul. 7, 1987

[54] COMPENSATED LASER RESONANT FLUORESCENCE BEAM SENSING DEVICE FOR NEUTRAL PARTICLE BEAMS

[75] Inventors: Robert W. Jones; George R. Edlin; Brian R. Strickland; Thomas G. Roberts, all of Huntsville, Ala.

[73] Assignee: The United States of America as represented by the Secretary of the Army, Washington, D.C.

[21] Appl. No.: 943,239

[22] Filed: Dec. 18, 1986

[51] Int. Cl.[4] ..... H01S 3/10; H01S 3/13

[52] U.S. Cl. ..... 372/9; 372/32

*Primary Examiner*—Stephen C. Buczinski
*Assistant Examiner*—Linda J. Wallace
*Attorney, Agent, or Firm*—John C. Garvin; Freddie M. Bush

[57] ABSTRACT

A device for determining the direction of a neutral particle beam relative to a reference direction is provided. The technique of laser resonant fluorescence is used. Measurements are made near the doppler free angle and a direct view prism means is used for automatically compensating for small drifts in the laser frequency is used to insure that the most accurate alignment results are obtained even with laser frequency changes.

5 Claims, 7 Drawing Figures

A statutory invention registration is not a patent. It has the defensive attributes of a patent but does not have the enforceable attributes of a patent. No article or advertisement or the like may use the term patent, or any term suggestive of a patent, when referring to a statutory invention registration. For more specific information on the rights associated with a statutory invention registration see 35 U.S.C. 157.

COMPENSATED LASER RESONANT FLUORESCENCE BEAM SENSING DEVICE FOR NEUTRAL PARTICLE BEAMS

DEDICATORY CLAUSE

The invention described herein may be manufactured, used, and licensed by or for the Government for governmental purposes without the payment to us of any royalties thereon.

BACKGROUND OF THE INVENTION

On Mar. 23, 1983, President Reagan directed the country to begin research toward the possibility of having a ballistic missile defense by the turn of the Century. The Strategic Defense Initiative (SDI) is divided into five program elements, including one for directed energy weapon technologies. The neutral particle beam (NPB) is one of these technologies. Neutral particle beams have several inherent properties that make them very attractive for space based applications, in particular, high energy neutral particles propagate in straight lines unaffected by the earth's magnetic field and have a very brief flight time to targets even at extended ranges. In addition, the neutral particles upon interaction with the surface of a target become high energy charge particles which penetrate deeply into the target as they deposit their energy.

Among the critical NPB engineering technologies are the development of high average power high beam qualitiy accelerators; large high quality magnetic optics; neutralization techniques which preserve the beam quality; and techniques for sensing and controlling the direction of the beam of neutral particles.

Interest in space based applications of these neutral particle beams began nearly a decade before President Reagan's directions when experiments, at the Los Alamos Clinton P. Anderson Meson Physics Facility (LAMPF), on the proton linear accelerator showed several orders of magnitude improvement in accelerator performance. Extensive measurements of beam properties at energies of 211 and 500 MeV showed that the energy spread of the beam was better than 0.5% and the emmittance of the beam was better that 0.06 cm-mrad. Also, the LAMPF accelerator has been used to accelerate $H^-$ ions to energies above 100 MeV with their behavior being similar to that for protons. These achievements prompted Knapp and NcNally to write a LANL report entitled "SIPAPU" in which they proposed a satellite-based high energy neutral hydrogen weapon; (see SIPAPU Report LA—5642—MS, Los Alamos National Laboratory, July 1974). Their device is depicted schematically in FIG. 1A, where an intense, high qualitiy beam of $H^-$ ions is generated and accelerated to an energy of approximately 250 MeV. After acceleration, the beam is expanded and passed through final focusing and steering magnets. The diameter of the beam in the accelerator and beam transport sections is measured in mm, but after expansion the diameter of the beam is of the order of a meter. Therefore, the beam area has been increased by a factor of the order of $10^6$ and the current density has also been decreased by this same amount. This low current density beam is subsequently neutralized by stripping the weakly bound electron from the $H^-$ ion and the resulting hydrogen beam propagates toward the target unaffected by the earth's magnetic field. Both the system and the target must remain above approximately 250 kilometers during the engagement in order to minimize beam degradation due to collisions with residual gases in the atmosphere. However, this does not preclude the system being used in a pop-up faction where the weapon is rocket borne for use in a fly-by or a fly-alone mode for either discrimination, target kill, or both. In case of a nuclear warhead, these particles are capable of heating the nuclear material by fission processes, neutron generation, and ionization. For nonnuclear heavy targets, heating is produced by ionization, possibly producing kill by thermal initiation of the weapon's high explosive. Also, the response of targets to the high energy neutral particle beam is different for lightweight decoys and massive ICBMs which allows these beams to be utilized in a discrimination role where small kinetic kill vehicles, similar to those used as anti-satellite weapons, are used to destroy the ICBMs once they have been identified or if the target is not too far away the NPB may be used to also destroy the identified massive targets.

Improvements in the state-of-the-art for intense high quality (high brightness) negative ion sources and lightweight efficient accelerators have been made. However, additional improvements are needed, and improvements in the state-of-the-art for compact lightweight power systems and for high current neutralizer techniques without excessive scattering are necessary before a device like this can be considered viable. Also, methods for neutral beam detection, signatures for closed loop tracking, for kill assessment, and techniques for rapidly steering the beam over larger angles are also needed. But, even though there are many practical issues to be considered, there does not appear, in principle, to be any inherent limitations that deem the device inviable. Many of the practical issues have been overcome and others are being addressed by the SDIO/BMDATC Neutral Particle Beam program. Among these are solutions for the neutralization of the $H^-$ ion beam and beam sensing techniques.

After the $H^-$ beam has been accelerated, expanded, aimed, and focused on the target, it must be neutralized and the neutral beams direction must be sensed and controlled so that it remains on the target. The technique used for sensing the neutral particle beam can depend on how the beam is neutralized. Neutralization can be accomplished by a number of techniques. For example, photodetachment, plasma, or gas stripping have been considered. Photodetachment causes less degradation in beam quality and can result in the largest fraction of the negative ion beam converted to a neutral beam. Unfortunately, extremely high energy CW lasers at wavelengths where these power levels are not currently available are required for this purpose, and even if they become available, they would probably be as large or as expensive and require as much prime power as the rest of the system. Since open ended plasma strippers with quiescent plasmas might cause less degradation in beam quality and neutralize a slightly large fraction of the negative ion beam than a gas stripper, they also have been studied. But, the power requirement for the plasma stripper alone is equal to or greater than that for the rest of the system. Also, it is problematical that a sufficiently quiescent plasma could be produced. Therefore, considerable work both theoretical and experimental has been devoted and is being devoted to the development of a gas stripper. The important results of this work is summarized in FIG. 1B where the fraction of the initial beam which survives as $H^-$, the fraction which is stripped to $H^0$, and the fraction which is stripped to $H^+$ is given as a function of the stripper thickness. Also, shown is the component of the $H^0$ beam which has not been elastically scattered (i.e., the useable part of the $H^0$ beam for targets at long ranges) and the component of the $H^0$ beam which has been elastically scattered (this is useful for beam sensing purposes). However, the gas neutralizer allows gases to escape out the ends and this has serious adverse systems implications. These implications are eliminated by the teachings of Roberts, Havard, and Wilkinson in U.S. patent application Ser. No. 397,371 titled "Solid Striper for a Space Based Neutral Particle Beam System:" and by Roberts, Edlin, and Strickland in AMPC 4358 "Supported Thin Foil Stripper and Simple Non-Obstructing Power Meter for a Space Based Neutral Particle Beam System." The data in FIG. 1B also applies to these strippers and that part of the neutral beam which has been elastically scattered and is in the metastable 2S state is available for beam sensing by the techniques of laser resonant fluorescence (LRF).

The technique of laser resonant fluorescence for sensing the direction of a neutral hydrogen particle beam was first published by G. Rohringer in 1977. The direction of the neutral hydrogen beam is sensed by shining a laser beam on the particle beam and observing the angle between the laser beam and the particle beam which caused a fluorescence signal to be generated (G. Rohringer "Particle Beam Diagnostics by Resonant Scattering," General Research Corp. # GRC-1-783 (1977)). To accomplish this, either a very high frequency ultraviolet laser was needed, or a significant fraction of the hydrogen atoms in the beam had to leave the stripper in the excited 2S metastable electronic state. Early predictions had suggested that there were not enough of these excited atoms, but the LANL 192 experiment on gas stripping indicated that there is approximately 8 percent in the 2S state, which is enough for beam sensing. Charles Starke Draper Laboratories performed a study to determine the theoretical limits on the accuracy that might be obtained by the laser resonant fluorescence technique. This effort included defining the mission requirements for the acquisition, pointing, and tracking and estimating the accuracy of the LRF technique for both sensing the direction of the beam and overcoming jitter. Also, an optical reference gyro could be used to align the LRF lasers and the target line of sight. An LRF sensing and control algorithm has been developed where emphasis is placed on using sub-beam sampling to control the mean direction of the beam, the focusing errors and beam abberations. Also, an autoalignment system was designed and control algorithms for the magnets in the beam line were developed. Finally an experimental verification of the LRF technique was performed (Moses, D., et. al., "The Angular Distribution of Neutral Hydrogen Following Collisional Electron Detachment from $H^-$," Los Alamos National Laboratory, (1981)) which validated the Geoni-Wright theoretical predictions for the angular divergence of the beam atoms lift in the 2S electronic state by a gas stripper (Genoi, T. C., and Wright, L. A., J. Phys. B, 13, 461, 1980)). However these experiments were performed on a Van de Graff accelerator at low energy and the accuracy obtainable by the LRF techniques could not be checked.

The frequency, $\upsilon_b$, seen by the atoms in the beam when the laser frequency in the lab frame is $\upsilon_L$ is given by $$\upsilon_b = \upsilon_L \gamma (1 - \beta \cos\theta) \tag{1}$$

where $\gamma = 1/(1-\beta^2)^{\frac{1}{2}}$, $\beta = v/c$ and V is the velocity of the particles in the beam, C is the velocity of light in vacuum, and 0 is the angle between the laser beam and the neutral particle beam. The sensitivity of $\upsilon_b$ to small changes in the angel $\theta$ is given by $$\frac{\delta\upsilon_b}{\upsilon_b} = \frac{\beta \sin\theta}{1 - \beta\cos\theta}\,\delta\theta \tag{2}$$

the sensitivity of $\upsilon_b$ to changes in $\beta$ is given by $$\frac{\delta\upsilon_b}{3098_b} = \frac{\beta - \cos\theta}{(1-\beta^2)(1-\beta\cos\theta)}\,\delta\beta \tag{3}$$

where it may be seen that at the angle $$\theta_{DF} = \cos^{-1}\beta \text{we have} \tag{4}$$

$(\delta\upsilon_b) = 0$ Thus, at this angle (known as the Doppler free angle) $\upsilon_b$ is insensitive to small changes is $\beta$ which results from the residual momentum spread in the beam. The sensitivity of $\upsilon_b$ to small drifts in the laser frequency is simply $$\delta\upsilon_b = \gamma(1 - \beta\cos\theta)\delta\upsilon_L \tag{5}$$

or $$(\delta\upsilon_b)/\upsilon_b = (\delta\upsilon_L)/\upsilon_L \tag{6}$$

Therefore, we can work at or near the doppler free angle as determined from equation 4 for the beam energy of the system under consideration by choosing the laser frequency $\upsilon_L$ so that $\upsilon_b$ as given by equation (1) is near the maximum of the cross section for exciting H(2S) to H(3P) in the beam frame, and thus producing the desired fluorescence.

Note that the direction of the beam is determined from measured values of $\theta$, $\beta$, and $\upsilon_L$, the above method will give the most accurate results providing $\upsilon_L$, is accurately known and does not change. Therefore the laser will have to be frequency stabilized. But even frequency stabilized lasers will experience frequency drifts when long term stability is attempted. Thus a need exists to compensate for this frequency drift so that it does not show up as a measured drift in the direction of the neutral beam. Therefore, and object of this disclosure is to provide a device which automatically compensates for small drifts in $\upsilon_L$.

SUMMARY OF THE INVENTION

In accordance with this invention, a beam sensing device is provided which utilizes the laser resonant fluorescence technique and in which a direct vision prism means is included which compensates for small variations in the laser wavelength so that the wavelength as seen by the beam particles in their rest frame remains on resonance.

DETAILED DESCRIPTION OF THE EMBODIMENT

Figure 1A:
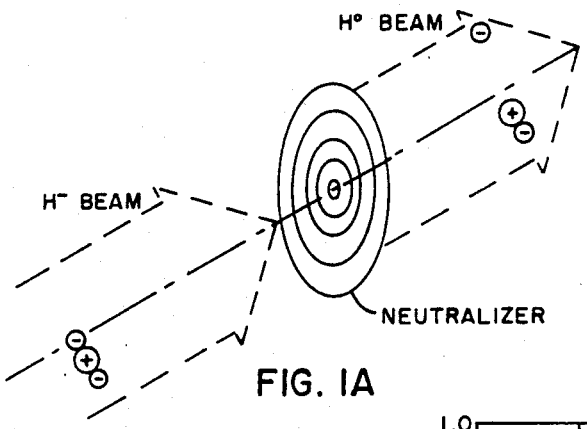
FIG. 1A is a schematic illustration of a space based neutral particle beam system.
Figure 1B:
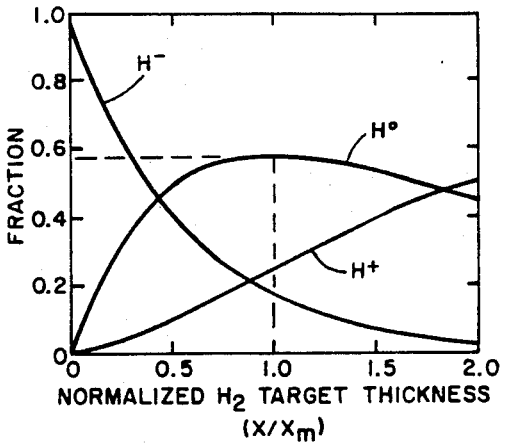
FIG. 1B shows the relative fractions of $H^0$, $H^-$, and $H^+$ as a fraction of stripper thickness.
Figure 2:
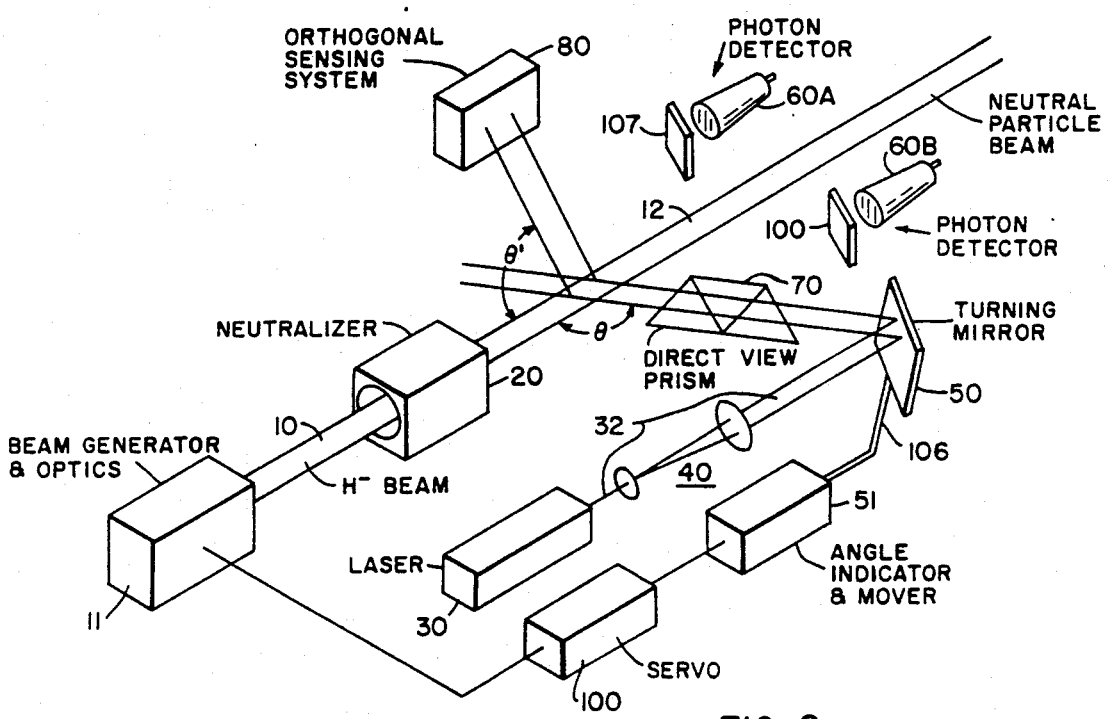
FIG. 2 is a schematic illustration of the laser resonant fluorescence beam sensing device.

Referring to the Figures, in FIG. 2 the high energy $H^-$ beam 10 from generator 11 passes through the neutralizer 20 and the high energy neutral particle beam 12 emerges from the neutralizer. A laser 30 produces a light beam 32 at chosen frequency $\nu_L$ and wavelength $\lambda_L$. Expansion optics 40 are used to expand and collimate the laser beam 32. The laser beam is directed toward the neutral particle beam by the tuning mirror 50 which varies the angle 0 between the laser beam and the neutral particle beam. The wavelength of the laser has been chosen such that the doppler shifted frequency and wavelength $\nu_b$ and $\lambda_b$ as seen by the neutral particles in the particle beam are those which match the cross section for excitation of hydrogen from the quantum state 2S to the quantum state 3P when the angle $\theta$ is the doppler free angle of $\theta_{DF}$ given by $\cos^{-1}\theta_{DF}=\beta$ where $\beta$ is given by V/c. V is the velocity of the neutral particles in the high energy particle beam relative to the space platform and c is speed of light in a vacuum. The value $\theta_{DF}$ has been chosen for $\theta$ because at this angle the probability of excitation from the 2S state to the 3P state is insensitive to small changes in $\beta$ that result from the momentum spread generated in the process of accelerating the $H^-$ particle to the required high energy. The value $0_{DF}$ is known as the doppler free angle and is often called the magic angle. The use of this angle helps maximize the accuracy to which the direction of the neutral particle beam may be determined. However, it would be better if both $\beta$ and $\lambda_L$ were constant.

$\beta$ is determined by the characteristics of the accelerator and has been kept as small as practical. Also, $\lambda_L$ is determined by the characteristics of the laser and $\Delta\lambda_L$ has been kept as small as is practical by using state-of-the-art techniques to stabilize the laser. However, over long times there are drifts in $\lambda_L$ which show up as false drifts in the direction of the neutral particle beam unless some compensation technique is emloyed.

In operation, the turning mirror 50 is used to vary $\theta$ until resonant fluorescence wavelengths are dictated by the detectors 60A and 60B. These detectors utilize filters 107 and 100 which pass only light at the resonant fluorescence wavelength so as to increase the signal to noise and to help increase the accuracy. There is also some collection optics which can be used for the detectors 60, not shown in the Figure. Now changes in the direction of the neutral particle beam require changes in $\theta$ which must be produced by using the turning mirror 50 in order to keep $\nu_b$ on resonance, and this information is fed back to the high energy $H^-$ beam optics 11 for the purpose of controlling or indicating the position of the high energy beams.

Figure 3B:
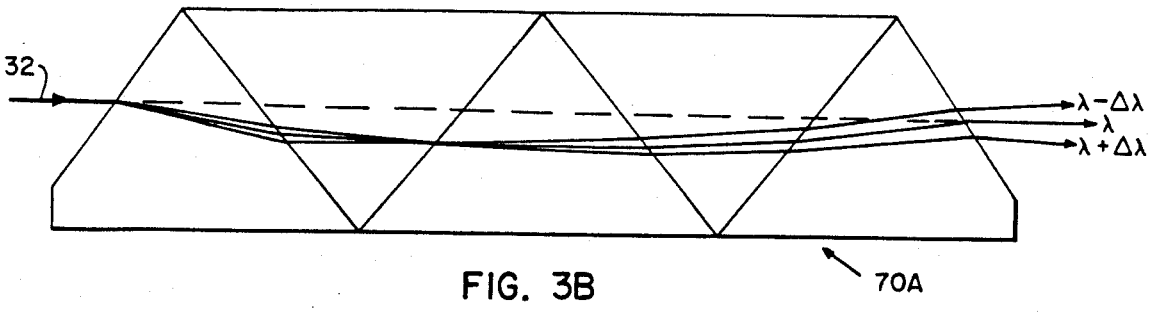
FIGS. 3A and 3B are schematic illustrations of the dispersion element to compensate for small drifts in $\nu_L$.
Figure 3A:
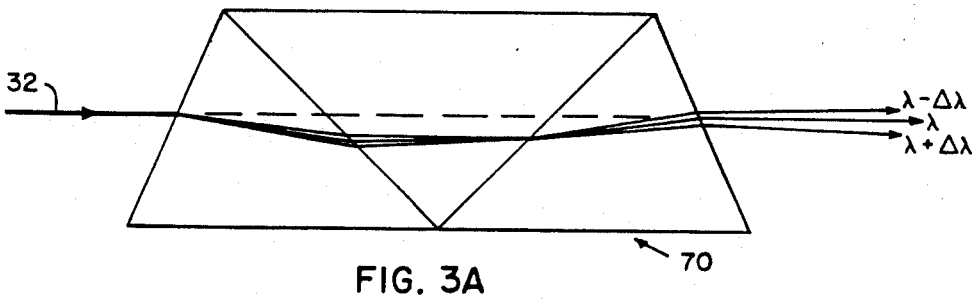

Element 70, a direct view prism, is inserted in the laser beam after it leaves the turning mirror. This element has the property of passing a central ray of a predetermined wavelength undeviated, but wavelengths which are longer or shorter emerges with their rays deviated due to dispersion. Two of these direct-view prisms are illustrated in FIGS. 3A and 3B. These prisms are described in standard text on optics such as "Fundamentals of Optics" by Jenkins and White, McGraw-Hill Book Company, Inc. (1957). In FIGS. 3A and 3B, the laser beam 32 is shown on the left as it approaches the element 70 and 70A. The prism, as explained below, has been constructed so that the chosen wavelength for operation, $\lambda_L$, which corresponds to $\theta_{DF}$ is the wavelength of the central ray and passes through undeviated. Therefore, when the laser is operating in an ideal manner, the prism is redundant. However, if in operation, the wavelength of the laser $\lambda_L$ drifts to a value of $\lambda_L \pm \Delta\lambda_L$ (here $\Delta\lambda_L$ is due to a drift in $\lambda_L$ and is not the bandwidth of the laser) then the orientation of the prism is such as to cause the laser beam 32 to be deviated in such a manner that the doppler shifted frequency $\nu_b$ and the wavelength $\nu_b$ as seen by the particles in the high energy neutral particle beam is unchanged. This is accomplished by small changes in $\theta$ away from $\theta_{DF}$ which may produce a small change in the bandwidth of the resonant fluorescence due to a little sensitivity to $\beta$ being introduced. However, as may be seen from equation 3, this effect is minimal near $\theta_{DF}$. Therefore with the prism in place, the signal as seen by detectors 60 will not change with these small drifts in $\lambda_L$. But, these signals will change if the direction of the high energy neutral particle beam changes because this produces an uncompensated change in $\theta$ and therefore $\lambda_b$ moves off resonance. To reestablish resonance mirror 50 will have to be adjusted by well known techniques (such as "dithering"). The new direction of the beam (given by indicator 51) can be determined in accordance to the position of mirror 50 and the corresponding mirror in the orthogonal sensing system 80. System 80 is identical to elements 30, 62,32, 40, 50, 51, 60, and 70, but aligned at 90° therefrom. The beam can now be caused to change position so as to bring it to a desired direction by well known servo systems 100. The mirror 50 and the prism 70 are mounted on separated platforms in manner such that they rotate about a common pivot point. The prism 70 moves through twice the angle that the mirror 50 is rotated so as to maintain alignment.

Figure 4A:
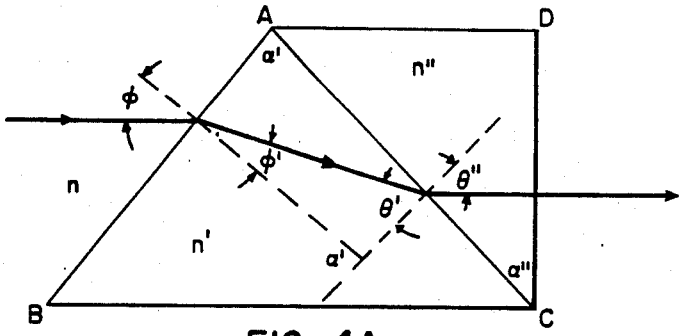
FIGS. 4A and 4B are schematic illustrations of the simplest type of direct vision prism.
Figure 4B:
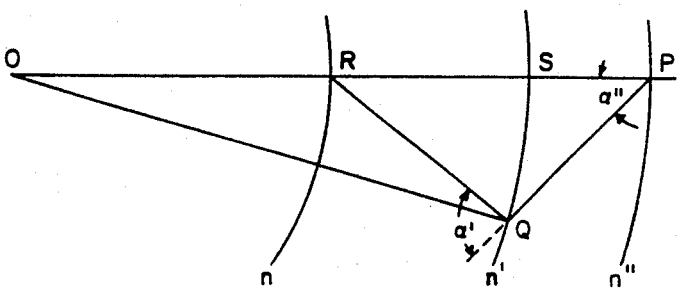

The primary function of a direct vision prism is to produce a spectrum where a central wavelength emerges from the prism parallel to the incident light. The simplest type of such a prism usually consists of the combination of a crown-glass prism index $\eta'$ and angle $\alpha'$ opposed to flint-glass prism of index $\eta''$ and angle $\alpha''$ as shown in FIG. 4A. The indices $\eta'$ and $\eta''$ chosen for the prisms are those for the central wavelength of the spectrum. A ray tracing diagram for the central ray is also shown in FIG. 4B. It may be noted that the direct vision prism in FIG. 3A is in principle two prisms of the type shown in FIG. 4A placed back to back. Configurations of the type shown in FIGS. 3A and 3B allow the central ray to pass through undeviated and as indicated more dispersion is obtained by adding more elements. The choice of flint-glass and crown-glass are generally made when the central ray is in the visible, say the sodium yellow D lines. However, in our case the laser beam may be rather large (requiring very heavy prisms if glass is used). The wavelength chosen for the central ray (that is the wavelength of the laser) is determined by both equation 12 and the required cross section for excitaiton to the 3P state from the 2S state. Therefore, we prefer to construct our prisms with thin transparent walls and to fill the inside with gases of various compositons at different pressures so as to vary $\eta'$ and $\eta''$ to obtain the desired values for different high energy particle beam systems.

Note that even though only one complete system is shown in FIG. 2, it is understood that there is a second complete system 80 orthogonal to this one since it is necessary to determine two angles say $\theta$ and $\theta_1$ before all dimensions of the direction of the high energy neutral particle beam are known.

We claim:

1. In a system where first and second energy beams are intersecting at an angle at an intersection so as to cause resonant fluorescence in accordance to factors including the magnitude of said angle and the frequency of said first beam, the improvement comprising a direct view prism positioned between said first beam and the intersection of said beams for causing a compensating change in the magnitude of said angle in accordance to a change in the frequency of said first beam.

2. A system as set forth in claim 1 wherein said first beam is a laser beam generated by a laser means and said direct view prism is positioned such that at a predetermined frequency, said first beam will pass through said prism unchanged in angle and at frequencies different from said predetermined frequency will exit said direct view prism at a changed angle and cause the angle of intersection of the two beams to be changed such that resonant fluorescence will still occur barring any change in the factors other than frequency.

3. A system as set forth in claim 2 further comprising a turning mirror positioned between said laser and said direct view prism so that the angle of said turning mirror gives an indication of the angle at which said first beam at said predetermined frequency would intersect said second beam regardless of the amount of shift in the angle presented by the direct view prism due to frequency change of said first beam.

4. A system as set forth in claim 3 further comprising photon detectors located in the vicinity of said intersection so as to generate an output upon the detection of the resonant fluorescence.

5. A system as set forth in claim 4 in which a third beam is located orthogonally to said first beam, and further turning mirrors photon detectors and direct view prisms are provided in the same manner as in the said first beam so as to provide position on said second beam.

* * * * *